US012130221B1

(12) United States Patent
Lv et al.

(10) Patent No.: US 12,130,221 B1
(45) Date of Patent: Oct. 29, 2024

(54) INFINITELY EXPANDABLE MODULAR VISUAL DEVICE FOR SIMULATION OF FLOW IN POROUS MEDIA

(71) Applicant: CHINA UNIVERSITY OF PETROLEUM—BEIJING, Beijing (CN)

(72) Inventors: Qichao Lv, Beijing (CN); Longxuan Li, Beijing (CN); Tongke Zhou, Beijing (CN); Honglei Zhan, Beijing (CN); Wei Wang, Beijing (CN); Rong Zheng, Beijing (CN); Xinshu Guo, Beijing (CN); Abdolhossein Hemmati-Sarapardeh, Beijing (CN); Jiayang Luo, Beijing (CN)

(73) Assignee: China University Of Petroleum—Beijing, Beijing (CN)

( * ) Notice: Subject to any disclaimer, the term of this patent is extended or adjusted under 35 U.S.C. 154(b) by 0 days.

(21) Appl. No.: 18/678,870

(22) Filed: May 30, 2024

(30) Foreign Application Priority Data

May 31, 2023 (CN) .......................... 202310639500.9

(51) Int. Cl.
*G01N 15/08* (2006.01)
(52) U.S. Cl.
CPC . *G01N 15/0826* (2013.01); *G01N 2015/0833* (2013.01)
(58) Field of Classification Search
CPC .. G01N 15/08; G01N 15/082; G01N 15/0826; G01N 2015/0833
See application file for complete search history.

(56) References Cited

U.S. PATENT DOCUMENTS

| 12,019,206 B1 * | 6/2024 | Li ......................... G01V 9/005 |
| 2013/0018641 A1 * | 1/2013 | Prisco .................... G01V 20/00 |
| | | 702/47 |

(Continued)

FOREIGN PATENT DOCUMENTS

| CN | 101446189 A | 6/2009 |
| CN | 102128837 A | 7/2011 |

(Continued)

OTHER PUBLICATIONS

Notification to Grant Patent Right for Invention issued in related Chinese Application No. 202310639500.9 on Apr. 3, 2024, in 9 pages.

(Continued)

*Primary Examiner* — Eric S. McCall
(74) *Attorney, Agent, or Firm* — Davis Wright Tremaine LLP (57) ABSTRACT

An infinitely expandable modular visual device for simulation of flow in porous media, including a simulation component, a fluid conveying component, and an image acquisition component; the simulation component includes a plurality of simulation units forming at least one layer of simulation unit array, the simulation unit includes a mounting base and a microscopic visualization model including a chip cover and a chip carrier having a porous media region and covered by the chip cover; the mounting bases of respective simulation units are connected to each other, the porous media regions of adjacent simulation units are communicated with each other; the fluid conveying component includes an injection-production pipeline communicated with the simulation units and configured to introduce the simulation fluid into the porous media region; the image acquisition component includes an image sensor facing the (Continued)

simulation unit for acquiring images of fluid flow in porous media.

19 Claims, 6 Drawing Sheets

(56) References Cited

U.S. PATENT DOCUMENTS

| | | | |
|---|---|---|---|
| 2013/0116997 A1* | 5/2013 | Sun | G06F 30/15 |
| | | | 703/9 |
| 2014/0005983 A1* | 1/2014 | Baer | G06F 30/23 |
| | | | 703/1 |
| 2014/0019053 A1* | 1/2014 | de Prisco | G06F 30/20 |
| | | | 702/12 |
| 2014/0032193 A1* | 1/2014 | Killough | E21B 43/00 |
| | | | 703/10 |
| 2014/0343909 A1* | 11/2014 | Guerillot | G01V 20/00 |
| | | | 703/2 |
| 2017/0098019 A1* | 4/2017 | Yadollahi-Farsani | |
| | | | G06F 17/11 |
| 2017/0292904 A1* | 10/2017 | Xing | G01N 33/241 |
| 2019/0331579 A1* | 10/2019 | Yang | G01N 13/02 |
| 2021/0096276 A1* | 4/2021 | Annavarapu Srinivas | |
| | | | G01V 20/00 |
| 2022/0205896 A1 | 6/2022 | Xiao et al. | |
| 2023/0288606 A1* | 9/2023 | Zapata Arboleda | G06V 20/64 |
| 2024/0084698 A1* | 3/2024 | Gong | E21B 43/26 |

FOREIGN PATENT DOCUMENTS

| | | |
|---|---|---|
| CN | 202947950 U | 5/2013 |
| CN | 103247215 A | 8/2013 |
| CN | 103352695 A | 10/2013 |
| CN | 205483942 U | 8/2016 |
| CN | 109386276 A | 2/2019 |
| CN | 109827884 A | 5/2019 |
| CN | 212379253 U | 1/2021 |
| CN | 116125034 A | 5/2023 |

OTHER PUBLICATIONS

Yu, et al., "An Experimental Study on the Porous-flow Characteristics of Heterogeneous Low-permeability Reservoirs," Journal of Southwest Petroleum University (Science & Technology Edition), Jun. 2018, 10 pages, vol. 40 No. 30.

Nie, et al., "Seepage experiment and numerical simulation based on microfluidic chip model," Journal of Zhejiang University (Engineering Science), May 2023, in 11 pages, vol. 57 No.5.

* cited by examiner

INFINITELY EXPANDABLE MODULAR VISUAL DEVICE FOR SIMULATION OF FLOW IN POROUS MEDIA

CROSS-REFERENCE TO RELATED APPLICATION

This application claims priority to Chinese Patent Application No. 202310639500.9, filed on May 31, 2023, which is hereby incorporated by reference in its entirety.

TECHNICAL FIELD

The present disclosure belongs to the technical field of oil and gas field development and technical field of microfluidic chip, in particular to an infinitely expandable modular visual device for simulation of flow in porous media.

BACKGROUND

As a new type of analysis and detection platform, microfluidic chip can accurately manipulate fluid in micro- and nano-sized channels. In recent years, with the progress of microfluidic manufacturing technology and image acquisition and processing system related technology, microfluidic technology has made significant progress. It can achieve in-situ observation and analyze the flow mechanism in porous media and thermodynamic properties of fluid at micro- and nano-scales, and has been widely concerned in related fields such as biology, medicine, environment, and petroleum.

Microfluidic technology has the advantage of real-time visualization. The fluid flow characteristics in porous media exhibited by fluids in microfluidic micro/nanostructures are completely different from macroscopic scales, but similar to porous media such as underground soil and rocks. Microfluidic chips have micro/nanostructures that enable real-time visualization of invisible underground physical and chemical processes.

Microfluidic technology has been well applied in the field of oil and gas production, such as simulation of sandstone and other reservoir porous media, and visual explanation of the microscopic percolation mechanism of porous media. At present, a single-module microfluidic chip is usually used to simulate a specific formation structure in a certain plane, and then the flow phenomenon of fluid in the micro structures will be displayed through an image acquisition component and a display system.

However, these chips cannot simulate the formation structure with a combination of complex lithology and pore properties, and fail to observe fluid flow phenomena in porous media within complex formation in real-time.

SUMMARY

The present disclosure provides an infinitely expandable modular visual device for simulation of flow in porous media, taking underground three-dimensional porous media as a simulation object and aiming at the shortcomings of existing microfluidic devices. It can be expanded in three dimensions to simulate the combination of complex lithology, pore properties, and heterogeneous characteristics of the formation, and to allow for gas and water injection, etc., to visually study the interface phenomena and multiphase flow in porous media laws in porous media, thereby providing an efficient and convenient research method for porous media in fields such as geology, environment, petroleum and more.

The present disclosure provides an infinitely expandable modular visual device for simulation of flow in porous media, including a simulation component, a fluid conveying component, and an image acquisition component; the simulation component includes a plurality of simulation units, which form at least one layer of simulation unit array, and each simulation unit includes a microscopic visualization model and a mounting base, and the microscopic visualization model includes a chip carrier and a chip cover, and the chip carrier has a porous media region, and the chip cover is covered on the chip carrier; the mounting bases of respective simulation units are connected with each other, and porous media regions of adjacent simulation units are communicated with each other; the fluid conveying component includes an injection-production pipeline communicated with the simulation units and configured to guide/direct a simulation fluid into the porous media region; the image acquisition component includes an image sensor facing the simulation units for acquiring a fluid flow in porous media image.

As the infinitely expandable modular visual device for simulation of flow in porous media mentioned above, in an implementation, a cross-section of the simulation unit in a horizontal direction of the chip cover is rectangular, and the plurality of simulation units are arranged side by side along an extension direction of the chip carrier so as to make the simulation unit array be in a matrix form.

As the infinitely expandable modular visual device for simulation of flow in porous media mentioned above, in an implementation, a cross-section of the mounting base in an extension direction of the chip cover is rectangular.

As the infinitely expandable modular visual device for simulation of flow in porous media mentioned above, in an implementation, the simulation unit also includes a connector, which is connected to corner sites of the mounting bases of adjacent simulation units to make different simulation units interconnected.

As the infinitely expandable modular visual device for simulation of flow in porous media mentioned above, in an implementation, the mounting base has a first mounting hole, the connector has a second mounting hole opposite to the first mounting hole, and the connector is connected to two adjacent mounting bases through pin shafts penetrating through the first mounting hole and the second mounting hole.

As the infinitely expandable modular visual device for simulation of flow in porous media mentioned above, in an implementation, the mounting base includes an upper base and a lower base, which together enclose a mounting cavity, and the microscopic visualization model is embedded inside the mounting cavity, and the mounting cavity has an opening arranged on a side of the mounting base, the opening is configured to communicate with adjacent simulation units on an outer side of the mounting base.

As the infinitely expandable modular visual device for simulation of flow in porous media mentioned above, in an implementation, the chip carrier has a fully etched region and a bonding region, and the bonding region is located on a side of the fully etched region adjacent to an edge of the chip carrier, and the fully etched region extends to the opening of the mounting cavity.

As the infinitely expandable modular visual device for simulation of flow in porous media mentioned above, in an implementation, the plurality of simulation units include a first simulation unit and a second simulation unit, and the mounting base of the first simulation unit has an injection hole communicated with the porous media region, and the mounting base of the second simulation unit has an outflow hole communicated with the porous media region.

As the infinitely expandable modular visual device for simulation of flow in porous media mentioned above, in an implementation, the injection-production pipeline includes an injection pipe for injecting a fluid and an outflow pipe for outflowing the fluid after flow in the porous media, and the injection hole is communicated with the injection pipe, and the outflow hole is communicated with the outflow pipe.

As the infinitely expandable modular visual device for simulation of flow in porous media mentioned above, in an implementation, at least one of the chip cover and the chip carrier corresponding to the first simulation unit has a first avoidance hole communicated with the injection hole;

at least one of the chip cover and the chip carrier corresponding to the second simulation unit has a second avoidance hole communicated with the outflow hole.

As the infinitely expandable modular visual device for simulation of flow in porous media mentioned above, in an implementation, the plurality of simulation units form a two-layer simulation unit array stacked up and down, and the porous media regions in the two-layer simulation unit array are communicated with each other.

As the infinitely expandable modular visual device for simulation of flow in porous media mentioned above, in an implementation, the image acquisition component also includes a microscope arranged between the image sensor and the simulation unit, and an eyepiece end of the microscope is arranged opposite to the image sensor.

The present disclosure provides an infinitely expandable modular visual device for simulation of flow in porous media, including a simulation component, a fluid conveying component, and an image acquisition component; the simulation component includes a plurality of simulation units, which form at least one layer of simulation unit array, and each simulation unit includes a microscopic visualization model and a mounting base, and the microscopic visualization model includes a chip carrier and a chip cover, and the chip carrier has a porous media region, and the chip cover is covered on the chip carrier; the mounting bases of respective simulation units are connected with each other, and the porous media regions of adjacent simulation units are communicated with each other; the fluid conveying component includes an injection-production pipeline communicated with the simulation unit and configured to guide/direct a simulation fluid into the porous media region; the image acquisition component includes an image sensor facing the simulation units for acquiring a fluid flow in porous media image. The present disclosure provides an infinitely expandable modular visual device for simulation of flow in porous media, which can observe phenomena of fluid flow in porous media in complex reservoir formation in real-time.

The present disclosure achieves the following beneficial technical.

(1) The modular structure designed by the present disclosure consists of at least one layer of simulation units, which can be infinitely expanded according to experimental purposes. By designing interlayer pipelines and support frames, vertical expansion and interlayer circulation can be achieved. By designing the boundary connector for simulation units and using the bolts to tighten and constrain adjacent simulation units, the connection of adjacent units and fluid communication are achieved, and the physical simulation of three-dimensional structure of porous media structures is realized with modular structure.

(2) In the present disclosure, it is possible to distinguish and produce microscopic visualization models of different pore structures and different lithology by designing the etching and modification processes of microfluidic chips. Arranging and combining according to certain rules or purposes overcomes the disadvantage of conventional microfluidic chips simulating a specific single formation structure within a certain plane in small-scale, and can accurately depict the characteristics of any type of underground rock layer such as the complex lithology, pore characteristics, and heterogeneity.

(3) The present disclosure can achieve inter-layer circulation through interlayer pressure-resistant quick connectors, achieve the intra-layer circulation in fully etched regions, and eliminate boundary effects. Designing the size of the sealing ring, achieving interference fit with the microscopic visualization model and mounting base, and ensuring the continuity of characteristics of fluid flow in porous media between adjacent simulation units, can restore the true law of fluid flow in three-dimensional porous media under different geological conditions.

In addition to the technical problems solved by the present disclosure, the technical features constituting the technical solutions, and the beneficial effects brought by the technical features of these technical solutions described above, the other technical problems that may be solved by the infinitely expandable modular visual device for simulation of flow in porous media of the present disclosure, the other technical features included in the technical solutions and the beneficial effects brought by these technical features will be further explained in detail in specific embodiments.

DESCRIPTION OF THE REFERENCE SIGNS

1—infinitely expandable modular visual device for simulation of flow in porous media;
10—simulation component;
100—simulation unit;
100*a*—first simulation unit;
100*b*—second simulation unit;
100*c*—third simulation unit;
110—upper base;
120—microscopic visualization model;
121—chip cover; 122—chip carrier;
1221—bonding area; 1222—fully etched area; 1223—porous media area; 1224—fluid injection groove; 1225—microscopic fluid flow channel;
130—lower base;
131—first mounting hole;
132—locating groove;
133—sealing groove;
140—connector;
141—second mounting hole;
150—sealing ring;
160—bolt;
170—nut;
20—fluid conveying component;
21—fluid injection port; 22—micro valve; 23—injection-production pipeline; 231-injection pipe; 232—outflow pipe; 24—pressure-resistant quick connector; 25—temperature and pressure acquisition point; 26—fluid outflow port;
30—image acquisition component;
31—image sensor; 32—processor;
40—support frame.

DESCRIPTION OF EMBODIMENTS

In order to make the purpose, technical solution, and advantage of the embodiments of the present application clearer, the following will provide a clear and complete description of the technical solution in the embodiments of the present application with reference to the accompanying drawings in the embodiments of the present application. It is evident that the described embodiments are a part of the embodiments of the present application, not all of them. Based on the embodiments in the present application, all other embodiments obtained by the person skilled in the art without creative labor fall within the scope of protection in the present application.

An infinitely expandable modular visual device for simulation of flow in porous media in the embodiments is further described below.

Figure 1:
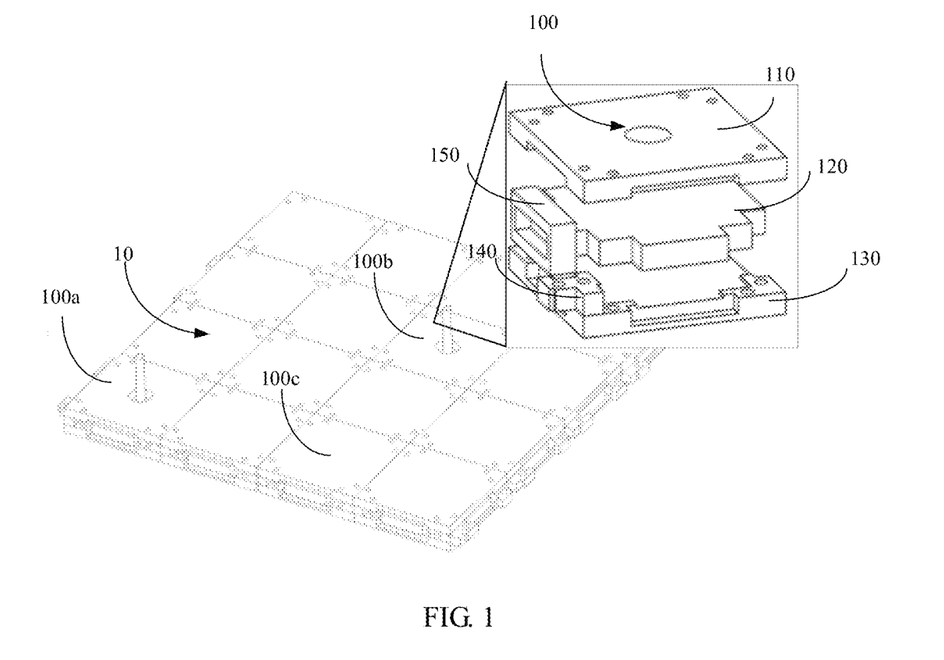
FIG. 1 is a schematic diagram of assembling of an infinitely expandable modular visual device for simulation of flow in porous media provided in an embodiment of the present application.

FIG. 1 is a schematic diagram of assembling of an infinitely expandable modular visual device for simulation of flow in porous media provided in an embodiment of the present application.

Figure 2:
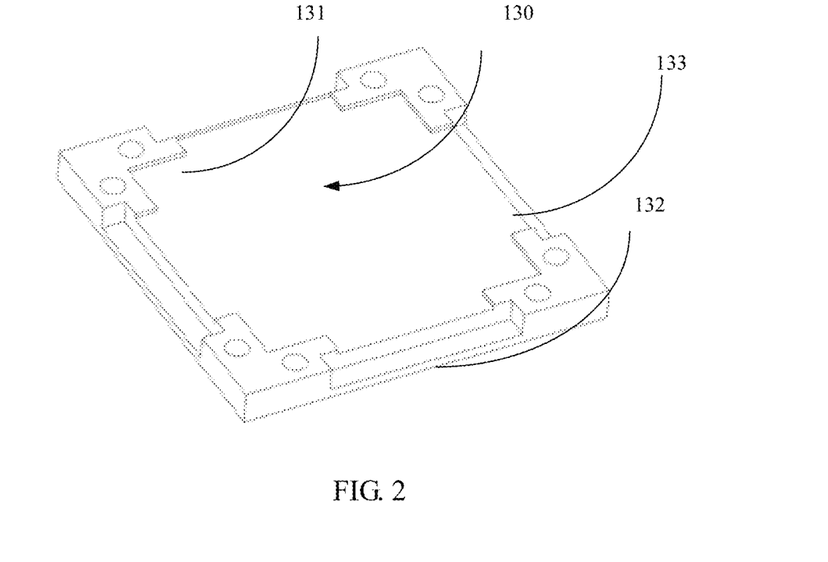
FIG. 2 is a structural schematic diagram of a lower base of an infinitely expandable modular visual device for simulation of flow in porous media provided in an embodiment of the present application.

FIG. 2 is a structural schematic diagram of a lower base of an infinitely expandable modular visual device for simulation of flow in porous media provided in an embodiment of the present application.

Figure 3:
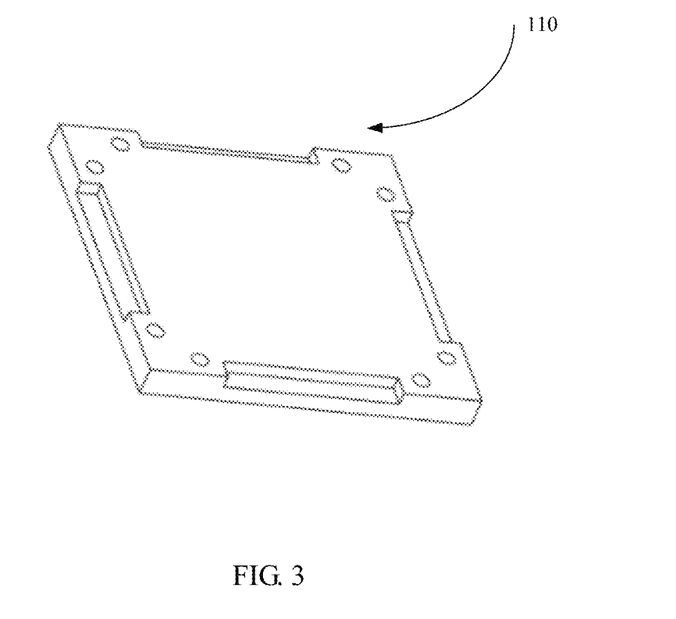
FIG. 3 is a structural schematic diagram of an upper base of an infinitely expandable modular visual device for simulation of flow in porous media provided in an embodiment of the present application.

FIG. 3 is a structural schematic diagram of an upper base of an infinitely expandable modular visual device for simulation of flow in porous media provided in an embodiment of the present application.

Figure 4:
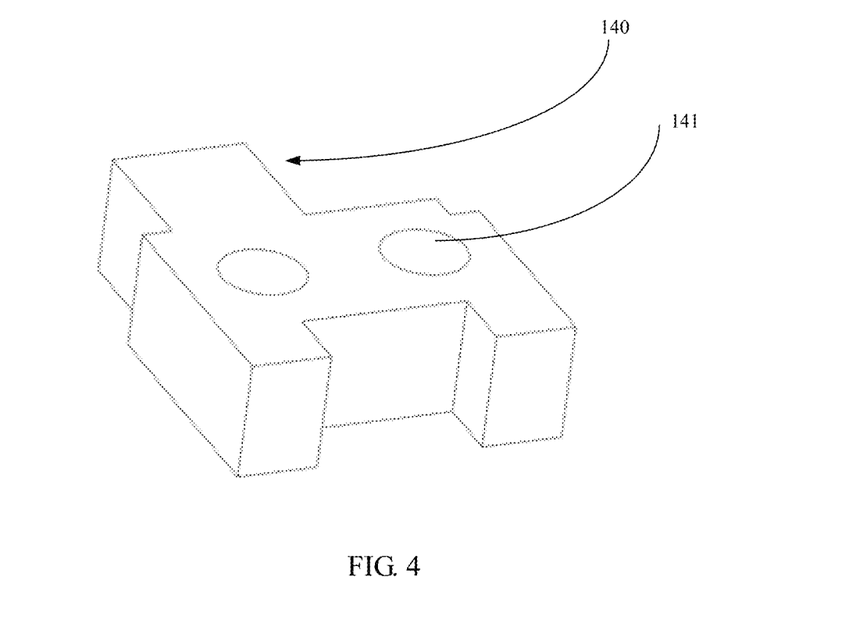
FIG. 4 is a structural schematic diagram of a connector of an infinitely expandable modular visual device for simulation of flow in porous media provided in an embodiment of the present application.

FIG. 4 is a structural schematic diagram of a connector of an infinitely expandable modular visual device for simulation of flow in porous media provided in an embodiment of the present application.

Figure 5:
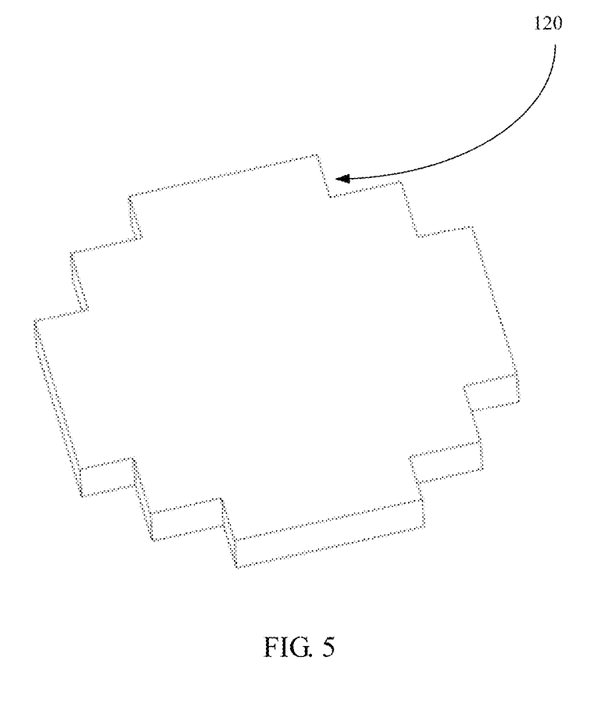
FIG. 5 is a structural schematic diagram of a microscopic visualization model of an infinitely expandable modular visual device for simulation of flow in porous media provided in an embodiment of the present application.

FIG. 5 is a structural schematic diagram of a microscopic visualization model of an infinitely expandable modular visual device for simulation of flow in porous media provided in an embodiment of the present application.

Figure 6:
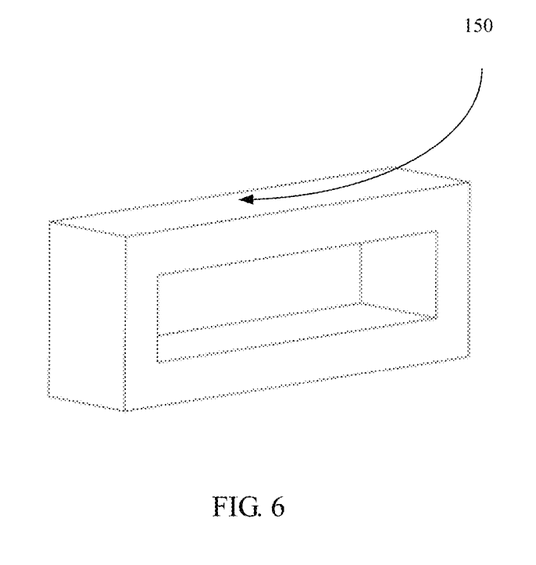
FIG. 6 is a structural schematic diagram of a sealing ring of an infinitely expandable modular visual device for simulation of flow in porous media provided in an embodiment of the present application.

FIG. 6 is a structural schematic diagram of a sealing ring of an infinitely expandable modular visual device for simulation of flow in porous media provided in an embodiment of the present application.

Figure 7:
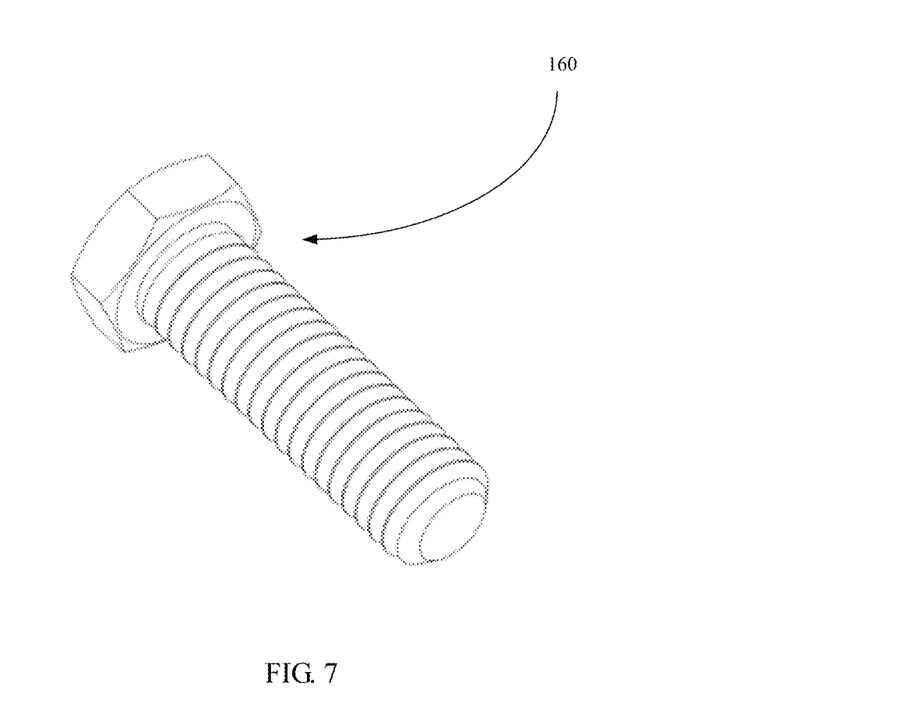
FIG. 7 is a structural schematic diagram of a bolt of an infinitely expandable modular visual device for simulation of flow in porous media provided in an embodiment of the present application.

FIG. 7 is a structural schematic diagram of a bolt of an infinitely expandable modular visual device for simulation of flow in porous media provided in an embodiment of the present application.

Figure 8:
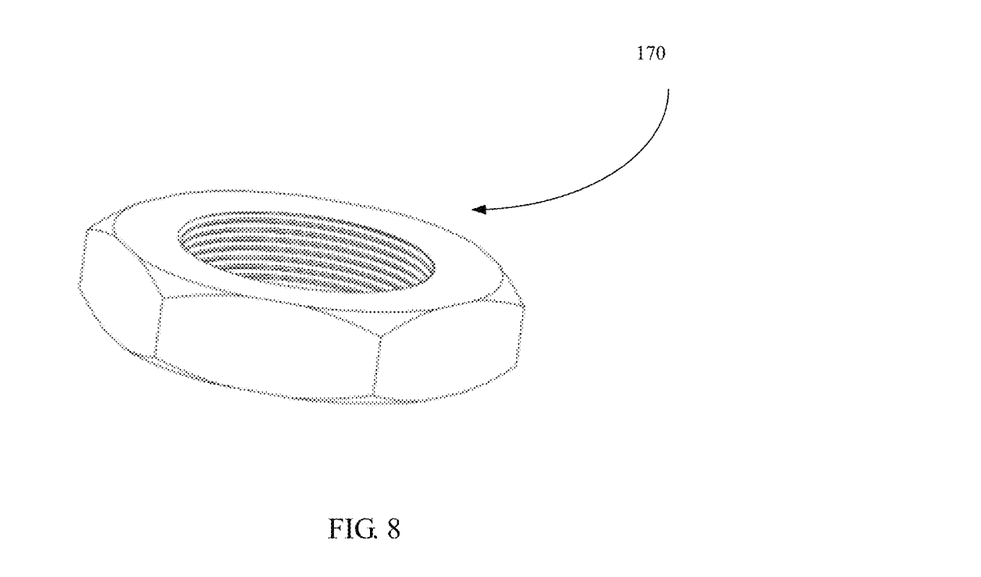
FIG. 8 is a structural schematic diagram of a nut of an infinitely expandable modular visual device for simulation of flow in porous media provided in an embodiment of the present application.

FIG. 8 is a structural schematic diagram of a nut of an infinitely expandable modular visual device for simulation of flow in porous media provided in an embodiment of the present application.

Figure 9:
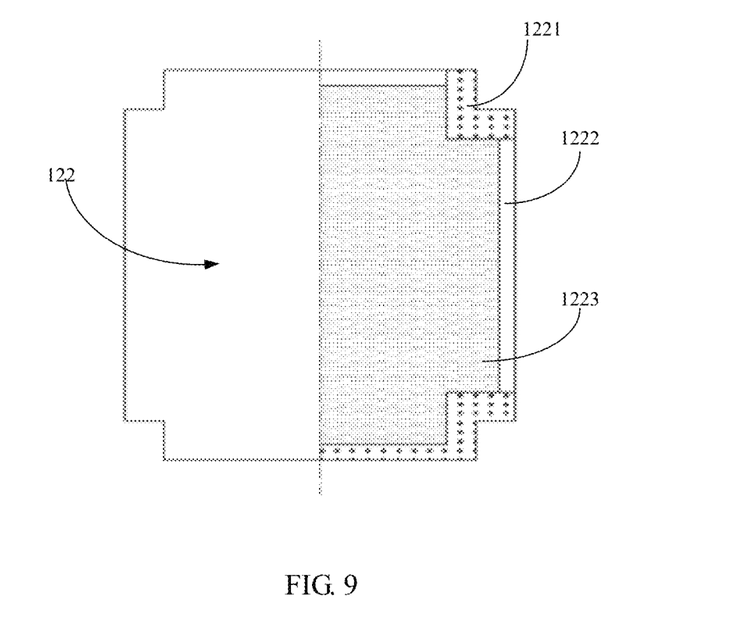
FIG. 9 is a cross-sectional view of a microscopic visualization model of an infinitely expandable modular visual device for simulation of flow in porous media provided in an embodiment of the present application.

FIG. 9 is a cross-sectional view of a microscopic visualization model of an infinitely expandable modular visual device for simulation of flow in porous media provided in an embodiment of the present application.

Figure 10:
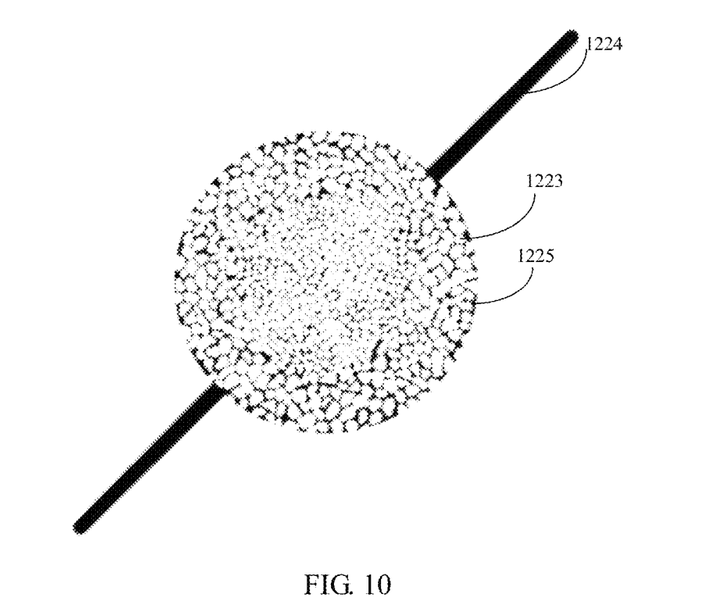
FIG. 10 is an internal structural diagram of a microscopic visualization model of an infinitely expandable modular visual device for simulation of flow in porous media provided in an embodiment of the present application.

FIG. 10 is an internal structural diagram of a microscopic visualization model of an infinitely expandable modular visual device for simulation of flow in porous media provided in an embodiment of the present application.

Figure 11:
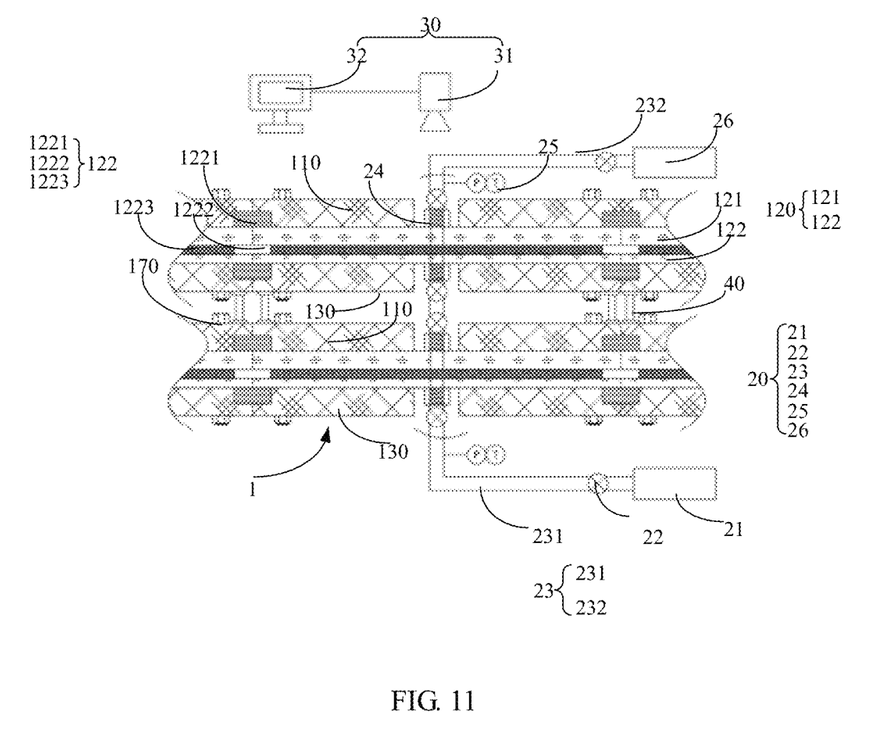
FIG. 11 is a cross-sectional view of a three-dimensional expansion mode of an infinitely expandable modular visual device for simulation of flow in porous media provided in an embodiment of the present application.

FIG. 11 is a cross-sectional view of a three-dimensional expansion mode of an infinitely expandable modular visual device for simulation of flow in porous media provided in an embodiment of the present application.

As shown in FIG. 1, an embodiment of the present application provides an infinitely expandable modular visual device for simulation of flow in porous media 1. Specifically, it includes a simulation component 10, a fluid conveying component 20, and an image acquisition component 30. The simulation component 10 includes a plurality of simulation units 100, which form at least one layer of simulation unit 100 array, and each simulation unit 100 includes a microscopic visualization model 120 and a mounting base, and the microscopic visualization model 120 includes a chip carrier 122 and a chip cover 121. The chip carrier 122 has a porous media region 1223, and the chip cover 121 is covered on the chip carrier 122. The mounting bases of respective simulation units 100 are connected to each other, and the porous media regions 1223 of adjacent simulation units 100 are communicated with each other. The fluid conveying component 20 includes an injection-production pipeline 23, which is communicated with the simulation unit 100 and is configured to introduce the simulation fluid into the porous media region 1223. The image acquisition component 30 includes an image sensor 31 facing the simulation units 100, which is configured for acquiring fluid flow in porous media images.

By improving the structure of the simulation component 10, porous media regions 1223 and fully etched regions 1222 are etched on the microscopic visualization model 120 inside the simulation component 10, thereby causing the adjacent simulation units 100 to be communicated with each other and arranged into an array with a certain number of layers according to the actual situation, and the image sensor 31 is configured to capture the fluid flow phenomenon in porous media inside the simulation component 10, which can simulate formation structure with a combination of complex lithology and pore characteristics, and observe fluid flow phenomena in complex formation in real-time, when compared to traditional microfluidic device that can only simulate a single formation structure within a certain plane.

Specifically, the microscopic visualization model 120 is a device capable of observing the internal structure or internal objects, with at least some of its structure consisting of transparent or translucent materials, so that the structure housed internally may be observed through a microscope. Where, the microscopic visualization model may specifically be a structure such as a box shape. According to the different functions of the fluid inside the microscopic visualization model 120, the interior of the microscopic visualization model 120 is divided into three regions: a fluid inlet region, a fluid detection region, and a fluid outflow region. The structural diagram of the microscopic visualization model 120 is shown in FIG. 5.

Specifically, the material for a mounting base, a chip carrier 122, and a chip cover 121 is quartz glass or sapphire glass. The purpose of such arrangement is that the glass material has a certain strength and can bear larger load, and this kind of material has good light transmittance, facilitating the light path to enter the interior of the chip carrier 122 for observing the situation of fluid flow in porous media.

In some embodiments, the cross section of the simulation unit 100 in the plane direction of the chip cover 121 is rectangular, and a plurality of simulation units 100 are arranged side by side along the extension direction of the chip carrier 122, so that the array of simulation units 100 is in a form of matrix, as shown in FIG. 1.

In some embodiments, the cross section of the mounting base in the extension direction of the chip cover 121 is rectangular, as shown in FIG. 2, and a locating groove 132 is also provided inside the mounting base. The locating groove 132 has the corresponding shape as the microscopic visualization model 120, and is used for positioning microscopic visualization model 120. Inside the mounting base, there is also a sealing groove 133 for placing a sealing ring 150.

Specifically, the mounting base has a side length of 4-10 cm and a thickness of 3-6 mm, the locating groove 132 has a depth of 1-2 mm, and the sealing groove 133 has a depth of 2-4 mm. The size of the locating groove 132 matches the size of the microscopic visualization model 120, allowing the microscopic visualization model 120 to be fully clamped inside the locating groove 132 to fix the microscopic visualization model 120, and avoiding virtual shadows caused by shaking of the microscopic visualization model 120 during the experiment, which lead to unclear captured pictures and affect experimental results.

The simulation unit 100 also includes a connector 140, as shown in FIG. 4. The connector 140 is connected to the corner sites of the mounting bases of adjacent simulation units 100, as shown in FIG. 1, so as to connect different simulation units 100 with each other.

Specifically, longitudinal constraints are achieved between the adjacent four simulation units 100 through structural coordination, and the infinite expansion of the simulation unit 100 in the longitudinal direction is achieved through the connection of the connector 140.

Specifically, the thickness of the connector 140 is 3-6 mm, which is consistent with the thickness of microscopic visualization model 120. The purpose of such arrangement is to form a tight coupling between the connector 140 and the microscopic visualization model 120.

In some embodiments, the mounting base has a first mounting hole 131, the connector 140 has a second mounting hole 141 corresponding to the first mounting hole 131, and the connector 140 connects two adjacent mounting bases through a pin shaft, a bolt 160 shown in FIG. 7 and a nut 170 shown in FIG. 8, penetrating through the first mounting hole 131 and the second mounting hole 141.

Where, the material of the mounting base is transparent, temperature-resistant and pressure-resistant polycarbonate (PC) board or glass fiber reinforced plastic. The material has the characteristics of temperature resistance of 120-150° C. and pressure resistance of 0-10 MPa, which can prevent the mounting base from cracking under higher pressure when simulating the phenomenon of fluid flow in the formation.

The mounting base includes an upper base 110 and a lower base 130, as shown in FIGS. 2 and 3. The upper base 110 and the lower base 130 together enclose a mounting cavity, and the microscopic visualization model 120 is embedded in the mounting cavity. The mounting cavity has an opening arranged on the side of the mounting base, which is configured to communicate with adjacent simulation unit 100 on the outer side of the mounting base. The connector 140 is arranged at the opening on the side of the mounting base for transversely connecting with two adjacent simulation units 100.

Specifically, the microscopic visualization model 120 is located in the middle of the mounting cavity, as shown in FIG. 1. The upper surface of the microscopic visualization model 120 is attached to the upper base 110, and the lower surface of the microscopic visualization model 120 is attached to the lower base 130.

Specifically, the interior of the mounting cavity also includes a sealing ring 150, as shown in FIG. 6. The inner ring of the sealing ring 150 is stuck at the edge of the microscopic visualization model 120, and the outer ring of the sealing ring 150 is in contact with the sealing groove 133 inside the mounting base. Two adjacent simulation units 100 share the same one sealing ring 150 to achieve transverse expansion. By aligning the fully etched regions of adjacent microscopic visualization models 120 laterally through interference fit, fluid communication within adjacent simulation units 100 is achieved.

Specifically, the thickness of the inner ring of the sealing ring 150 is 2-5 mm, and the thickness of the outer ring of the sealing ring is 9-15 mm. The thickness of the inner ring is slightly smaller than the thickness of the microscopic visualization model 120, and the thickness of the outer ring is slightly larger than the sum of the thickness of the microscopic visualization model 120 and the thickness of the sealing grooves 133 of the upper base 110 and the lower base 130. Such arrangement aims to form an interference fit and ensure its sealing performance, preventing the fluid of the adjacent two simulation units 100 from leaking when flowing through the fully etched regions.

It should be noted that the material of the sealing ring 150 may be nitrile rubber, fluorosilicone rubber, etc. The material chosen has the characteristics of temperature resistance of 120-150° C., pressure resistance of 0-10 MPa, salt resistance, acid and alkali resistance, oil resistance, etc., avoiding fluid corrosion of the sealing ring 150 during simulation experiments, and may prolong the service cycle of the sealing ring 150.

In some embodiments, the chip carrier 122 has a fully etched region 1222 and a bonding region 1221, as shown in FIG. 9. The bonding region 1221 is located on the side of the fully etched region 1222 adjacent to the edge of the chip carrier 122, and the fully etched region 1222 extends to the opening of the mounting cavity.

Where, the chip carrier 122 forms a porous media region 1223 through exposure etching process, as shown in FIG. 9, and the microscopic fluid flow channel 1225 in the porous media region 1223 has a width of 0.1-500 m and a depth of 0.1-500 m.

Specifically, the porous media region 1223 also includes a fluid injection groove 1224, as shown in FIG. 10, which is disposed on the diagonal line of the microscopic visualization model 120. The fluid injection groove 1224 is communicated with the microscopic fluid flow channel 1225. The fluid flows into the microscopic fluid flow channel 1225 through the fluid injection groove 1224.

Where, the chip carrier 122 and the chip cover 121 are connected together by thermal bonding, thereby causing the bonded microscopic visualization model 120 to have sufficient sealing property and mechanical strength to avoid cracking and liquid leakage. Moreover, this bonding mode may avoid introducing other impure during bonding and interfering with the experimental results.

Specifically, the location of the fully etched region 1222 may be set according to the actual formation structure to be simulated, i.e., the fully etched region 1222 may be set on both sides of the microscopic visualization model 120, for communicating with the adjacent simulation units 100 on both sides. At the same time, the fully etched region 1222 may also be set on one side of the microscopic visualization model 120, and the other side may be used to set a closed boundary.

It should be noted that, the depth of the fully etched region 1222 is the same as the size of the porous media. The purpose of such arrangement is to eliminate boundary effects and ensure the continuity of fluid flow in porous media between adjacent simulation units 100. At the same time, surface modification technology may also be used to control the surface characteristics of the fully etched region 1222, such as wettability, roughness, etc., to simulate the conditions of fluid in porous media under different wetting conditions.

Specifically, in the microscopic visualization model 120, various porous media morphologies may be designed based on different templates used for exposure etching and different modification techniques, where, different permeability may be set in the microscopic visualization models 120 of different simulation units 100, and a specific heterogeneous array of simulation unit 100 may be formed according to the regular arrangement of permeability.

Specifically, different pore structures may also be etched in the microscopic visualization models 120 of different simulation units 100 to simulate intergranular pore structure, pure crack structure, crack-intergranular pore structure, pore-intergranular pore structure, intergranular pore-micro crack-large cave structure, and intergranular pore-micro crack-large crack structure. etc.

Specifically, the surface of micro-channels of the microscopic visualization model 120 in different simulation units 100 may be covered with clay particles or rock particles to simulate different lithology or soil types.

In some embodiments, a plurality of simulation units 100 include a first simulation unit 100a and a second simulation unit 100b. The mounting base of the first simulation unit 100a has an injection hole communicated with the porous media region 1223, and the mounting base of the second simulation unit 100b has an outflow hole communicated with the porous media region 1223, as shown in FIGS. 9 and 11; the injection-production pipeline 23 includes an injection pipe 231 for injecting the fluid and an outflow pipe 232 for outflow of the fluid in the porous media region 1223 after fluid flow in porous media. The injection hole is communicated with the injection pipe 231, and the outflow hole is communicated with the outflow pipe, as shown in FIG. 11. Where, the injection pipe 231 and the outflow pipe 232 are respectively arranged at the fluid injection inlet 21 and the fluid outflow port 26.

Specifically, the simulation unit also includes a third simulation unit 100c. The base of the third simulation unit 100c is closed and has no central hole. The third simulation unit 100c is configured to be connected with the first simulation unit 100a and the second simulation unit 100b to construct a combined environment of formation.

In some embodiments, at least one of a chip cover 121 and a chip carrier 122 corresponding to the first simulation unit 100a has a first avoidance hole communicated with the injection port; at least one of a chip cover 121 and a chip carrier 122 corresponding to the second simulation unit 100b has a second avoidance hole communicated with an outflow port. Where, the first and second avoidance holes are arranged for communicating with the etching porous media.

Specifically, the chip cover 121 and chip carrier 122 of the microscopic visualization model 120 are externally connected with a pressure-resistant quick connector 24, which is vertically distributed and has the characteristics of plug and play, and can be convenient for disassembling and fetching. Where, each pressure-resistant quick connector 24 is equipped with a micro valve 22 and a temperature and pressure acquisition point 25, which may accurately control the temperature and pressure at the injection port and the outflow port of each simulation unit 100.

Specifically, the fluid conveying component 20 also includes a liquid injection pump (not shown in the Figure), which acts in coordination with the micro valve 22 to drive the fluid to flow at a certain speed.

Specifically, there are two test tubes (not shown in the Figure) located at the fluid injection port 21 and the fluid outflow port 26, respectively. The experimental fluid is loaded into the test tube located at the fluid injection port 21, and is injected into the microscopic visualization model 120 through the injection pipe; and after passing through the porous media region 1223 for detection, the fluid will then flow through the outflow pipe to the inside of the test tube at the fluid outflow port 26 for collection and storage.

In some embodiments, the plurality of simulation units 100 form a two-layer simulation unit array, which is stacked up and down, and the porous media regions 1223 in the two-layer simulation unit 100 array are communicated with each other.

Where, a support frame 40 is arranged in the middle of the two layers of simulation units 100 stacked up and down, for supporting adjacent simulation units 100 and sharing the vertical load of the injection pipe 231 and the outflow pipe 232.

In some embodiments, the image acquisition component 30 also includes a microscope, which is arranged between an image sensor 31 and the simulation unit 100; and an eyepiece end of the microscope is arranged opposite to the image sensor 31.

In an implementation, a light source such as a light-emitting diode is disposed above the microscope, which irradiates the light onto the microscopic visualization model 120. The interior of the microscopic visualization model 120 is composed of the microscopic fluid flow channel 1225 and unetched glass. When the fluid flows through the irradiated region of the light source via the microscopic fluid flow channel 1225, detection begins. Due to the different refractive indices of glass and fluid, different images will be presented in different regions.

Specifically, the image sensor 31 is a Complementary Metal-Oxide-Semiconductor (CMOS) sensor. The fluid inside the microscopic visualization model 120 has the characteristics of trace amount, small sample size, and fast flow rate, etc. Complementary Metal-Oxide-Semiconductor (CMOS) sensor has a chip with large size of imaging target surface and good photosensitive performance, and may shoot tiny fluids moving in the microscopic visualization model 120 and effectively capture images of rapidly moving objects.

Specifically, the image acquisition component 30 also includes a processor 32, and the image sensor 31 transmits the fluid flow in porous media signal to the processor 32. The internal self-contained image processing software of the processor 32 is configured to analyze the law of flow in porous media.

The working process of the infinitely expandable modular visual device for simulation of flow in porous media 1 is described as follows.

Firstly, according to the desired simulation purpose, a certain number of simulation components 10 with a certain number of layers is dertermined, and microscopic visualization models 120 with different properties are prepared based on the desired simulation purpose and combined according to a certain law, so that the combined simulation components 10 can simulate real geological features. Next, a first simulation unit 100a is selected as the initial injection point, a second simulation unit 100b is selected as the outflow point, an injection-production pipeline 23 are disposed and connected outside the first simulation unit 100a and the second simulation unit 100b, the fluid injection port 21 and fluid outflow port 26 are each connected with one test tube externally, water is injected into the simulation component 10 through the fluid injection port 21, with the pressure set to the maximum operating pressure, and the operating pressure is maintained for about 40 minutes. If there is no liquid leakage at the connection between the pressure-resistant quick connector 24 and the micro valve 22, it is considered qualified. At this time, the simulation experiment begins. Finally, the simulation component 10 is placed under an image acquisition component 30 to observe the characteristics of flow in porous media and flow phenomena of internal fluid.

In the present embodiments, an infinitely expandable modular visual device for simulation of flow in porous media 1 includes a simulation component 10, a fluid conveying component 20, and an image acquisition component 30; the simulation component 10 includes a plurality of simulation units 100, which form at least one layer of simulation unit 100 array, and each simulation unit 100 includes a microscopic visualization model 120 and a mounting base, the microscopic visualization model 120 includes a chip carrier 122 and a chip cover 121, and the chip carrier 122 has an etched porous media region 1223, and the chip cover 121 is covered on the chip carrier 122; the mounting bases of respective simulation units 100 are connected to each other, and the porous media regions 1223 corresponding to adjacent simulation units 100 are communicated with each other; the fluid conveying component 20 includes an injection-production pipeline 23, which is communicated with the simulation units 100 and is configured to introduce the simulation fluid into the porous media region 1223; the image acquisition component 30 includes an image sensor 31 facing the simulation unit 100, which is configured for acquiring images of fluid flow in porous media. By improving the structure of the simulation component 10, porous media regions 1223 and fully etched regions 1222 are etched on the microscopic visualization model 120 inside the simulation component 10, thereby causing the adjacent simulation units 100 to be communicated with each other and arranged into an array with a certain number of layers according to the actual situation, and the image sensor 31 is configured to capture the phenomenon of fluid flow in porous media inside the simulation component 10, which can simulate formation structure with a combination of complex lithology and pore characteristics, and observe phenomena of fluid flow in porous media in complex formation in real-time, when compared to traditional microfluidic device that can only simulate a single formation structure within a certain plane.

It should be pointed out that the embodiments indicated by "one embodiment", "embodiment", "exemplary embodiment", "some embodiments", etc. mentioned in the description may include specific feature, structure or characteristic, but not necessarily every embodiment includes that specific feature, structure or characteristic. Furthermore, such phrases may not necessarily refer to the same embodiment. In addition, when describing specific feature, structure or characteristic in conjunction with embodiments, it is within the knowledge scope of the person skilled in the art to implement such feature, structure or characteristic in conjunction with other embodiments that are clearly or not clearly described.

Generally speaking, terms should be understood at least partially by usage in the context. For example, at least partially depending on the context, the term "one or more" as used herein may be used to describe any feature, structure or characteristic in a singular sense, or a combination of features, structures or characteristics in plural sense. Similarly, at least partially based on the context, terms such as "a/an/one" may also be understood as conveying singular or plural usage.

It should be easily understood that the terms "on", "over" and "above" in the present disclosure should be interpreted in the broadest way, so that "on" not only means "directly on something", but also includes the meaning of "on something" with an intermediate feature or layer therebetween, and "over" or "above" not only includes the meaning of "over something" or "above something", it may also include the meaning of 'over something' or 'above something' without an intermediate feature or layer therebetween (i.e. directly on something).

In addition, for the convenience of explanation, spatial relative terms such as "underneath", "below", "under", "above", "over", etc. may be used in the text to describe the relationship of an element or a feature with respect to other elements or features as shown in the Figures. Spatial relative terms are intended to encompass different orientations of devices in use or operation other than those shown in the attached drawings. The device may have other orientations (rotated by 90 degrees or in other orientations), and the spatial relative descriptors used in the text may also be explained accordingly.

Finally, it should be noted that the above embodiments are only used to illustrate the technical solutions of the present disclosure, but not to limit it; although the present disclosure has been described in detail with reference to the aforementioned embodiments, it should be understood by persons skilled in the art that the technical solutions recorded in the aforementioned embodiments may still be modified or some or all of the technical features of the technical solutions may be equivalently replaced; while these modifications or replacements do not depart the essence of the corresponding technical solutions from the scope of the various embodiments of the present disclosure.

What is claimed is:

1. An infinitely expandable modular visual device for simulation of flow in porous media, comprising a simulation component, a fluid conveying component, and an image acquisition component; wherein
the simulation component comprises a plurality of simulation units, which form at least one layer of simulation unit array, and each simulation unit comprises a microscopic visualization model and a mounting base, and the microscopic visualization model comprises a chip carrier and a chip cover, and the chip carrier has a porous media region, and the chip cover is covered on the chip carrier; the mounting bases of respective simulation units are connected with each other, and porous media regions of adjacent simulation units are communicated with each other;
the fluid conveying component comprises an injection-production pipeline communicated with the simulation units and configured to introduce a simulation fluid into the porous media region;
the image acquisition component comprises an image sensor facing the simulation units for acquiring an image of fluid flow in porous media.

2. The infinitely expandable modular visual device for simulation of flow in porous media according to claim 1, wherein the plurality of simulation units form a two-layer simulation unit array, and the two-layer simulation unit array is stacked up and down, and the porous media regions in the two-layer simulation unit array are communicated with each other.

3. The infinitely expandable modular visual device for simulation of flow in porous media according to claim 1, wherein the image acquisition component also comprises a microscope arranged between the image sensor and the simulation unit, and an eyepiece end of the microscope is arranged opposite to the image sensor.

4. The infinitely expandable modular visual device for simulation of flow in porous media according to claim 1, wherein the mounting base comprises an upper base and a lower base, which together enclose a mounting cavity, and the microscopic visualization model is embedded inside the mounting cavity, and the mounting cavity has an opening arranged on a side of the mounting base, the opening is configured to communicate with adjacent simulation units on an outer side of the mounting base.

5. The infinitely expandable modular visual device for simulation of flow in porous media according to claim 4, wherein the chip carrier has a fully etched region and a bonding region, and the bonding region is located on a side of the fully etched region adjacent to an edge of the chip carrier, and the fully etched region extends to the opening of the mounting cavity.

6. The infinitely expandable modular visual device for simulation of flow in porous media according to claim 1, wherein the plurality of simulation units comprise a first simulation unit and a second simulation unit, and the mounting base of the first simulation unit has an injection hole communicated with the porous media region, and the mounting base of the second simulation unit has an outflow hole communicated with the porous media region;
the injection-production pipeline comprises an injection pipe for injecting a fluid and an outflow pipe for outflow of the fluid after flow in the porous media region, and the injection hole is connected to the injection pipe, and the outflow hole is communicated with the outflow pipe.

7. The infinitely expandable modular visual device for simulation of flow in porous media according to claim 6, wherein at least one of the chip cover and the chip carrier corresponding to the first simulation unit has a first avoidance hole communicated with the injection hole;
at least one of the chip cover and the chip carrier corresponding to the second simulation unit has a second avoidance hole communicated with the outflow hole.

8. The infinitely expandable modular visual device for simulation of flow in porous media according to claim 1, wherein a cross-section of the simulation unit in a plane direction of the chip cover is rectangular, and the plurality of simulation units are arranged side by side along an extension direction of the chip carrier so as to make the simulation unit array be in a matrix form.

9. The infinitely expandable modular visual device for simulation of flow in porous media according to claim 8, wherein the mounting base comprises an upper base and a lower base, which together enclose a mounting cavity, and the microscopic visualization model is embedded inside the mounting cavity, and the mounting cavity has an opening arranged on a side of the mounting base, the opening is configured to communicate with adjacent simulation units on an outer side of the mounting base.

10. The infinitely expandable modular visual device for simulation of flow in porous media according to claim 8, wherein the plurality of simulation units comprise a first simulation unit and a second simulation unit, and the mounting base of the first simulation unit has an injection hole communicated with the porous media region, and the mounting base of the second simulation unit has an outflow hole communicated with the porous media region;
the injection-production pipeline comprises an injection pipe for injecting a fluid and an outflow pipe for outflow of the fluid after flow in the porous media region, and the injection hole is connected to the injection pipe, and the outflow hole is communicated with the outflow pipe.

11. The infinitely expandable modular visual device for simulation of flow in porous media according to claim 8, wherein the plurality of simulation units form a two-layer simulation unit array, and the two-layer simulation unit array is stacked up and down, and the porous media regions in the two-layer simulation unit array are communicated with each other.

12. The infinitely expandable modular visual device for simulation of flow in porous media according to claim 8, wherein a cross-section of the mounting base in an extension direction of the chip cover is rectangular;

the simulation unit also comprises a connector, which is connected to corner sites of the mounting bases of adjacent simulation units to make different simulation units interconnected.

13. The infinitely expandable modular visual device for simulation of flow in porous media according to claim 12, wherein the mounting base comprises an upper base and a lower base, which together enclose a mounting cavity, and the microscopic visualization model is embedded inside the mounting cavity, and the mounting cavity has an opening arranged on a side of the mounting base, the opening is configured to communicate with adjacent simulation units on an outer side of the mounting base.

14. The infinitely expandable modular visual device for simulation of flow in porous media according to claim 12, wherein the plurality of simulation units comprise a first simulation unit and a second simulation unit, and the mounting base of the first simulation unit has an injection hole communicated with the porous media region, and the mounting base of the second simulation unit has an outflow hole communicated with the porous media region;
the injection-production pipeline comprises an injection pipe for injecting a fluid and an outflow pipe for outflow of the fluid after flow in the porous media region, and the injection hole is connected to the injection pipe, and the outflow hole is communicated with the outflow pipe.

15. The infinitely expandable modular visual device for simulation of flow in porous media according to claim 12, wherein the plurality of simulation units form a two-layer simulation unit array, and the two-layer simulation unit array is stacked up and down, and the porous media regions in the two-layer simulation unit array are communicated with each other.

16. The infinitely expandable modular visual device for simulation of flow in porous media according to claim 12, wherein the mounting base has a first mounting hole, the connector has a second mounting hole opposite to the first mounting hole, and the connector is connected to two adjacent mounting bases through pin shafts penetrating through the first mounting hole and the second mounting hole.

17. The infinitely expandable modular visual device for simulation of flow in porous media according to claim 16, wherein the mounting base comprises an upper base and a lower base, which together enclose a mounting cavity, and the microscopic visualization model is embedded inside the mounting cavity, and the mounting cavity has an opening arranged on a side of the mounting base, the opening is configured to communicate with adjacent simulation units on an outer side of the mounting base.

18. The infinitely expandable modular visual device for simulation of flow in porous media according to claim 16, wherein the plurality of simulation units comprise a first simulation unit and a second simulation unit, and the mounting base of the first simulation unit has an injection hole communicated with the porous media region, and the mounting base of the second simulation unit has an outflow hole communicated with the porous media region;
the injection-production pipeline comprises an injection pipe for injecting a fluid and an outflow pipe for outflow of the fluid after flow in the porous media region, and the injection hole is connected to the injection pipe, and the outflow hole is communicated with the outflow pipe.

19. The infinitely expandable modular visual device for simulation of flow in porous media according to claim 16, wherein the plurality of simulation units form a two-layer simulation unit array, and the two-layer simulation unit array is stacked up and down, and the porous media regions in the two-layer simulation unit array are communicated with each other.

\* \* \* \* \*